United States Patent
Hong et al.

(10) Patent No.: US 8,274,578 B2
(45) Date of Patent: Sep. 25, 2012

(54) GAZE TRACKING APPARATUS AND METHOD USING DIFFERENCE IMAGE ENTROPY

(75) Inventors: Kwang Seok Hong, Gwacheon (KR); Jun Ho Yoon, Ansan (KR); Jong Bae Jeon, Seongnam (KR); Kue Bum Lee, Seoul (KR)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 691 days.

(21) Appl. No.: 12/368,269

(22) Filed: Feb. 9, 2009

(65) Prior Publication Data

US 2009/0284608 A1    Nov. 19, 2009

(30) Foreign Application Priority Data

May 15, 2008 (KR) .................. 10-2008-0044950

(51) Int. Cl.
*H04N 5/228* (2006.01)
(52) U.S. Cl. ............. 348/222.1; 348/333.03; 382/181; 382/115; 382/117; 382/103
(58) Field of Classification Search .......... 348/222.1; 382/181, 103
See application file for complete search history.

(56) References Cited

U.S. PATENT DOCUMENTS

| | | | | |
|---|---|---|---|---|
| 5,471,542 A * | 11/1995 | Ragland | ........... | 382/128 |
| 5,481,622 A * | 1/1996 | Gerhardt et al. | ........... | 382/103 |
| 6,154,559 A * | 11/2000 | Beardsley | ........... | 382/103 |
| 6,246,779 B1 * | 6/2001 | Fukui et al. | ........... | 382/103 |
| 6,571,002 B1 * | 5/2003 | Ogawa | ........... | 382/117 |
| 6,578,962 B1 * | 6/2003 | Amir et al. | ........... | 351/209 |
| 6,714,665 B1 * | 3/2004 | Hanna et al. | ........... | 382/117 |
| 7,197,165 B2 * | 3/2007 | Ryan | ........... | 382/103 |
| 7,253,739 B2 * | 8/2007 | Hammoud et al. | ........... | 340/575 |
| 7,306,337 B2 * | 12/2007 | Ji et al. | ........... | 351/209 |
| 7,460,940 B2 * | 12/2008 | Larsson et al. | ........... | 701/49 |
| 7,742,623 B1 * | 6/2010 | Moon et al. | ........... | 382/103 |
| 7,783,077 B2 * | 8/2010 | Miklos et al. | ........... | 382/103 |
| 7,970,179 B2 * | 6/2011 | Tosa | ........... | 382/117 |
| 7,986,816 B1 * | 7/2011 | Hoanca et al. | ........... | 382/115 |
| 2004/0196433 A1 * | 10/2004 | Durnell | ........... | 351/209 |
| 2005/0129286 A1 * | 6/2005 | Hekimian | ........... | 382/117 |
| 2005/0238209 A1 * | 10/2005 | Ikeda et al. | ........... | 382/118 |
| 2006/0110014 A1 * | 5/2006 | Philomin et al. | ........... | 382/118 |
| 2006/0210121 A1 * | 9/2006 | Nakano et al. | ........... | 382/117 |
| 2007/0206856 A1 * | 9/2007 | Matsuda et al. | ........... | 382/171 |
| 2007/0297687 A1 * | 12/2007 | Yamasaki | ........... | 382/255 |
| 2008/0309872 A1 * | 12/2008 | Hara et al. | ........... | 351/206 |
| 2011/0299742 A1 * | 12/2011 | D'Hose | ........... | 382/117 |

FOREIGN PATENT DOCUMENTS

JP          2005100366        *    4/2005

* cited by examiner

*Primary Examiner* — Jason Chan
*Assistant Examiner* — Cynthia Segura
(74) *Attorney, Agent, or Firm* — Martine Penilla Group, LLP (57) ABSTRACT

In accordance with one aspect of the present invention, there is provided a gaze tracking apparatus using difference image entropy, comprising: image detection module for detecting user's eye region image from image of the user taken by picture-taking apparatus which is connected to the gaze tracking apparatus; image selection module for computing entropy value of difference image between the eye region image and a plurality of reference images respectively indicating each gazing direction and selecting reference image with least difference image entropy value among the plurality of reference images; and gaze tracking module for recognizing user's gazing direction by regarding gazing direction that the selected reference image indicates as user's gazing direction.

1 Claim, 5 Drawing Sheets

GAZE TRACKING APPARATUS AND METHOD USING DIFFERENCE IMAGE ENTROPY

CROSS-REFERENCE TO RELATED APPLICATION

The present application is claiming priority of Korean Patent Application No. 10-2008-0044950, filed on May 15, 2008, the content of which is incorporated herein by reference.

BACKGROUND OF THE INVENTION

1. Field of the Invention

The present invention relates to a gaze tracking apparatus and method using difference image entropy. More particularly, the present invention relates to a gaze tracking apparatus and method using difference image entropy obtained by acquiring difference image between input image and reference images or between input image and average image of the reference images and computing difference image entropy from the difference images.

2. Description of the Related Art

As technologies on mobile communications and information processing device has been developed, new service for human being's convenience has been demanded. Particularly, there is a move to develop a method replacing existing keypad input interface by tracking movement of user's pupil through camera and receiving menu input from the movement of the pupil.

SUMMARY OF THE INVENTION

It is, therefore, an object of the present invention to provide a gaze tracking apparatus and method using difference image entropy enabling users of mobile device or electronic device perform drawing, writing, etc. on the display as well as input control such as menu selection without existing keypad input interface.

In accordance with one aspect of the present invention, there is provided a gaze tracking apparatus using difference image entropy, comprising: image detection module for detecting user's eye region image from image of the user taken by picture-taking apparatus which is connected to the gaze tracking apparatus; image selection module for computing entropy value of difference image between the eye region image and a plurality of reference images respectively indicating each gazing direction and selecting reference image with least difference image entropy value among the plurality of reference images; and gaze tracking module for recognizing user's gazing direction by regarding gazing direction that the selected reference image indicates as user's gazing direction.

Preferably, the image detection module may comprise: face region detection unit for detecting the user's face region image from the image of the user taken by the picture-taking apparatus; and eye region detection unit for detecting the user's eye region image from the user's face region image.

Preferably, the image detection module may use at least one of Haar-like features, AdaBoost learning algorithm, Template matching, and Entropy method.

Preferably, the image selection module may compute difference image between the eye region image and the plurality of reference images using Equation below.

$$D(x, y) = Iinput(x, y) - I(x, y)$$

Where D (x, y) denotes pixel value of difference image between the eye region image and the reference images, Iinput (x, y) denotes pixel value of the eye region image and I (x, y) denotes pixel value of the reference image.

Preferably, the image selection module may compute entropy value of difference image between the eye region image and the reference images by Equation below.

$$E = \sum_{k=-m}^{+m} P_k \log_2 \frac{1}{P_k} = -\sum_{k=-m}^{+m} P_k \log_2 P_k$$

Where E denotes difference image entropy value, 'm' denotes boundary value of ranges of difference image's pixel value, and Pk denotes probabilities of the frequency of histogram having pixel value of 'k' in difference images.

Preferably, the image selection module may compute entropy value of difference image between the eye region image and average images respectively representing each gazing direction instead of the plurality of reference images and select average image with least difference image entropy value among the average images. The average images may be obtained by taking an average of pixel values of the reference images indicating each gazing direction, and the number of average images may be equal to the number of the gazing directions.

In accordance with another aspect of the present invention, there is provided a gaze tracking method using difference image entropy, comprising: detecting user's eye region image from inputted user's image; computing entropy value of difference image between the eye region image and a plurality of reference images respectively indicating each gazing direction and selecting reference image with least difference image entropy value among the plurality of reference images; and recognizing user's gazing direction by regarding gazing direction that the selected reference image indicates as user's gazing direction.

Preferably, said detecting user's eye region image may comprise: detecting the user's face region image from the image of the user; and detecting the user's eye region image from the user's face region image.

Preferably, said detecting user's eye region image may use at least one of Haar-like features, AdaBoost learning algorithm, Template matching, and Entropy method.

Preferably, the difference image between the eye region image and the plurality of reference images may be computed using Equation below.

$$D(x, y) = Iinput(x, y) - I(x, y)$$

Where D (x, y) denotes pixel value of difference image between the eye region image and the reference images, Iinput (x, y) denotes pixel value of the eye region image and I (x, y) denotes pixel value of the reference image.

Preferably, entropy value of difference image between the eye region image and the reference images may be computed by Equation below.

$$E = \sum_{k=-m}^{+m} P_k \log_2 \frac{1}{P_k} = -\sum_{k=-m}^{+m} P_k \log_2 P_k$$

Where E denotes difference image entropy value, 'm' denotes boundary value of ranges of difference image's pixel value, and Pk denotes probabilities of the frequency of histogram having pixel value of 'k' in difference images.

Preferably, entropy value of difference image may be computed between the eye region image and average images respectively representing each gazing direction, instead of the plurality of reference images, and average image with least difference image entropy value among the average images may be selected. The average images may be obtained by taking an average of pixel values of the reference images indicating each gazing direction, and the number of average images may be equal to the number of the gazing directions.

In accordance with the other aspect of the present invention, there is provided an information processing apparatus comprising: picture-taking module for taking images of user; gaze tracking module for detecting eye region image from the image taken by the picture-taking module, computing entropy value of difference image between the eye region image and a plurality of reference images respectively indicating each gazing direction, and recognizing user's gazing direction by regarding gazing direction corresponding to reference image with least difference image entropy value as the user's gazing direction; and control module for controlling to display a plurality of menu which user can select and to perform process designed for menu corresponding to the recognized gazing direction.

Preferably, the gaze tracking module may compute difference image between the eye region image and the plurality of reference images using Equation below.

$$D(x, y) = I\text{input}(x, y) - I(x, y)$$

Where D (x, y) denotes pixel value of difference image between the eye region image and the reference images, Iinput (x, y) denotes pixel value of the eye region image and I (x, y) denotes pixel value of the reference image.

Preferably, the gaze tracking module may compute entropy value of difference image between the eye region image and the reference images by Equation below.

$$E = \sum_{k=-m}^{+m} P_k \log_2 \frac{1}{P_k} = - \sum_{k=-m}^{+m} P_k \log_2 P_k$$

Where E denotes difference image entropy value, 'm' denotes boundary value of ranges of difference image's pixel value, and Pk denotes probabilities of the frequency of histogram having pixel value of 'k' in difference images.

According to the present invention, it is possible to replace the existing input interface using fingers, voice, mouse, keypad etc. with new input interface based on movement of user's pupils by equipping computer, portable terminal and various electronic devices etc. with picture-taking apparatus such as camera and tracking the movement of user's pupils based on difference image entropy computation.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Since many alternatives, modifications and variations can be made from the present invention, preferred embodiments of the present invention will now be described in detail with reference to the accompanying drawings. However, one should understand that it is not intended to be limiting, but embrace all modification, equivalents or substitutions included in the scope and technical field of the present invention. In the following description, well-known functions or constitutions will not be described in detail if they would obscure the invention in unnecessary detail.

Although terms like the first, the second, etc., may be used for explaining diverse elements, the elements are not to be limited by the terms. The terms are used only for distinguishing one element from another.

The terminology used in this application is used simply for explaining particular embodiments, and is not intended to limit the scope of the present invention in any way. As used throughout this disclosure, the singular forms include plural reference unless the context clearly indicates otherwise. Also, it should be understood that the expression of "comprise" or "include" in this disclosure is to designate the existence of features, numbers, steps, operations, elements, parts or combinations thereof that are described in the specification, and does not eliminate beforehand the existence of one or more of other features, numbers, steps, operations, elements, parts, or combinations thereof or the possibility of addition.

Hereinafter, preferred embodiments of the present invention will now be described with reference to the accompanying drawings. For a more complete understanding of the present invention and the advantages thereof, like reference numerals represent like parts even in different drawings.

Before getting into further details on the drawings, it is necessary to clarify that components described in this specification are divided by primary function each component is responsible for. That is, two or more components to be described below may be incorporated into one component, or one component may be differentiated into more than two by itemized function. In addition, any person skilled in the art may understand that each component may perform, besides its primary function, part or all of functions of another component additionally, and part of the primary function each component is responsible for may be carried out by another component. Therefore, it is important to note whether all components that are explained throughout this specification exist or not should be interpreted in terms of function, and for this reason the configuration of components of gaze tracking apparatus in accordance with the present invention may differ from that of FIG. 1 within the scope for achieving the foregoing objectives of the present invention.

Figure 1:
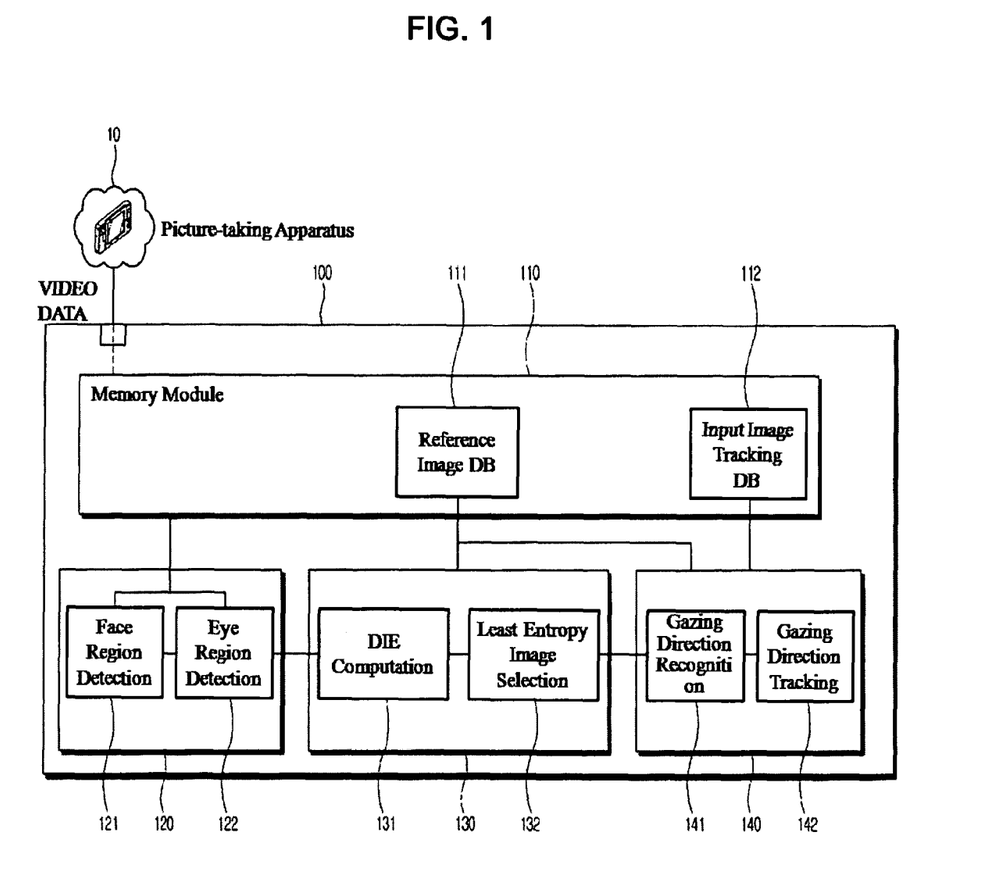
FIG. 1 illustrates configuration of a gaze tracking apparatus using difference image entropy in accordance with one embodiment of the present invention.

FIG. 1 illustrates configuration of a gaze tracking apparatus using difference image entropy in accordance with one embodiment of the present invention.

Referring to FIG. 1, the gaze tracking apparatus 100 according to the embodiment of the present invention comprises: memory module 110, image detection module 120, image selection module 130, and gaze tracking module 140. Further, the gaze tracking apparatus 100 is connected to a picture-taking apparatus 10 such as camera.

The image detection module 120 is configured to detect image of eye region from image of user taken by the picture-taking apparatus 10. The image detection module 120 comprises: face region detection unit 121 and eye region detection unit 122.

The face region detection unit 121 is configured to detect only face region from image of user that is inputted by the picture-taking apparatus 10 or that is stored in the memory module 110, using detection technologies such as Haar-like features, AdaBoost learning algorithm, Template matching, and Entropy method. Haar-like features are used to express feature values of various shapes depending on location, shapes and sizes. AdaBoost learning algorithm is used to construct a strong classifier group by combining weak multiple classifier. The feature values obtained as such have advantages that it is good to express features of face. The image of face region detected by the face region detection unit 121 is delivered to the eye region detection unit 122.

The eye region detection unit 122 detects only eye region from the face region image using Haar-like features, AdaBoost learning algorithm, Template matching, and Entropy method.

As described above, according to the embodiment of the present invention, eye region detection is performed by two steps using the face region detection unit 121 and the eye region detection unit 122. Thus, it is possible to precisely detect image of eye region.

The image selection module 130 comprises difference image entropy (DIE) computation unit 131 for performing difference image entropy computation between the detected eye region image and reference image or between the detected eye region image and average image of the reference images. The image selection module 130 further comprises least entropy image selection unit 132 for selecting reference image or average image which has least difference image entropy among reference images or average images that are used in a process of computing the difference image entropy.

The gaze tracking module 140 comprises gazing direction recognition unit 141 and gazing direction tracking unit 142. The gazing direction recognition unit 141 is configured to recognize user's gazing direction by regarding gazing direction that the selected reference image or average image indicates as user's gazing direction. Here, recognizing the gazing direction refers to recognizing which part of object screen or lens of picture-taking apparatus the user is gazing into. Further, the reference images are eye region images prepared for each gazing direction to help recognize user's gazing direction by comparing themselves with the detected eye region image, computing difference image entropy between themselves and the detected eye region image, selecting reference image with least difference image entropy and regarding that the user is gazing in the same gazing direction that the reference image with least difference image entropy indicates. Further, the average image refers to eye region image obtained by averaging all reference images indicating the same gazing direction. Thus, for example, if there are M'×N' gazing directions, the number of average images is equal to M'×N' and the number of reference images per each gazing direction can be freely defined. Here, the gazing direction is differentiated based on locations of pupil in the eye region images. The gazing direction tracking unit 142 tracks gazing direction based on the recognition result of the gazing direction recognition unit 141.

In the meantime, the memory module 110 stores images taken by the picture-taking apparatus 10, reference images and average images. The memory module 110 may store information on history of locations of pupil (i.e., gazing directions) in order to track movements of the pupil (i.e., variations of the gazing directions).

Reference image DB 111 of the memory module 110 is to store reference images corresponding to each gazing direction. The image selection module 130 reads out reference images stored in the reference image DB 111 and performs difference image entropy computation by means of pixel subtraction between the inputted and detected eye region image and reference image or between the input image and average image.

The input image tracking DB 112 stores information on history of locations of pupil. The gaze tracking apparatus 100 recognizes gazing directions periodically and the input image tracking DB 112 stores gazing directions in a certain interval of time. Using the information stored in the input image tracking DB 112, it is possible to track gazing directions.

Hereinafter, a process of performing difference image entropy computation in accordance with the present invention will be explained in detail.

The average image from the N reference images is given in Equation (1).

$$AvgI(x, y) = \frac{1}{N}\sum_{n=1}^{N} In(x, y) \quad (1)$$

Where AvgI(x, y) denotes pixel value of the average image in X-Y coordinate, N denotes the number of reference images used for generating the average image, and In(x, y) denotes pixel value of the nth reference image in X-Y coordinate.

The difference image entropy computation unit 131 computes difference image entropy using pixel values of the detected eye region image, reference image and average image and pixel values of difference images are obtained from Equations below.

$$D(x, y) = Iinput(x, y) - I(x, y) \quad (2)$$

$$DAvg(x, y) = Iinput(x, y) - AvgI(x, y) \quad (3)$$

Where D (x, y) denotes pixel value of difference image between the input image (i.e., detected image) and the reference image and DAvg (x, y) denotes pixel values of difference image between the input image and the average image. Iinput (x, y) denotes pixel value of the input image and I (x, y) denotes pixel value of the reference image.

Difference image entropy is given in Equation below.

$$E = -\sum_{k=-m}^{+m} P_k \log_2 \frac{1}{P_k} = -\sum_{k=-m}^{+m} P_k \log_2 P_k \quad (4)$$

Where E denotes difference image entropy value and 'm' ranges from −255 to +255 when images are 8 bits gray images. Ranges of the parameter 'm' may change depending on color types of images such as RGB image, Gray image, CMYK image, HIS image, HIV image, YIQ image, YUV image and YCbCr image. Pk denotes probabilities of the frequency of histogram in difference images.

The parameter Pk is given in Equation below.

$$P_k = \frac{a_k}{G_T} \quad (5)$$

Where ak indicates the frequency of histogram from the −255 histogram levels to the +255 histogram levels. The sum and total of each histogram in the difference images GT is given in Equation below.

$$G_T = \sum_{k=-m}^{+m} a_k \quad (6)$$

In this embodiment, we explained that picture-taking apparatus is located outside the gaze tracking apparatus 100 and connected to the gaze tracking apparatus. However, it should be noted that the skilled in the art can understand that the picture-taking apparatus can be embodied as picture-taking module mounted in the gaze tracking apparatus 100 in another embodiment.

Figure 2:
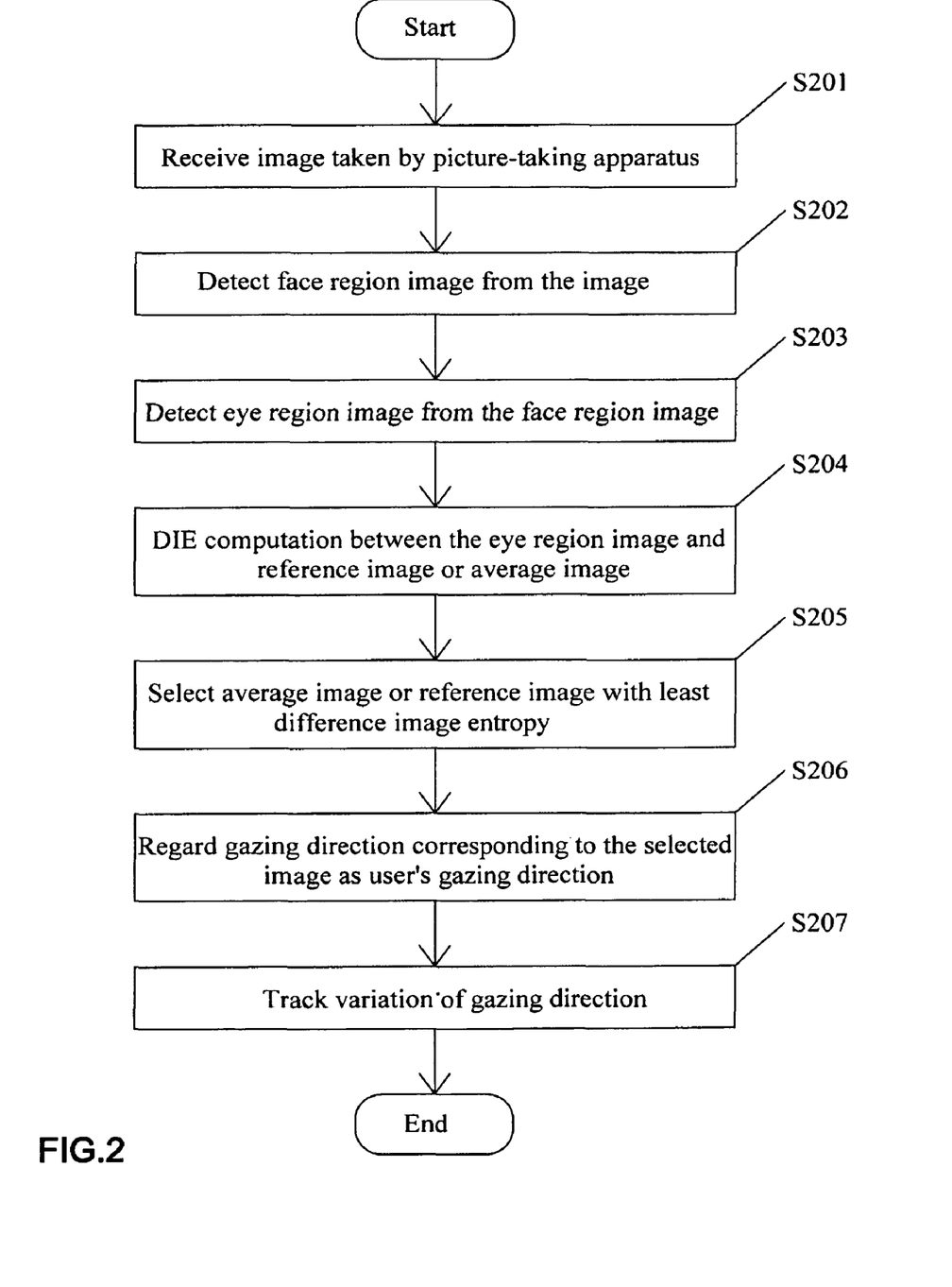
FIG. 2 illustrates flows of a gaze tracking method using difference image entropy in accordance with another embodiment of the present invention.

FIG. 2 illustrates flows of a gaze tracking method using difference image entropy in accordance with another embodiment of the present invention. Hereinafter, the flows of the method will be described in connection with the configuration illustrated in FIG. 1.

The gaze tracking apparatus 100 receives image taken by the picture-taking apparatus 10 from the picture-taking apparatus 10 (S201). Then, the received image (i.e. the input image) is analyzed and only face region of the image is detected from the input image (S202). Then, eye region image is detected from the face region image (S203).

In S202 and S203, images of certain region are extracted from the original images. It is preferable to use detection technologies such as Haar-like features, AdaBoost learning algorithm, Template matching, and Entropy method in order to effectively embody the above-mentioned detection steps.

Then, difference image entropy computation between the input image and the reference image is performed (S204). It should be noted that it is also possible for the gaze tracking apparatus according to the present invention to perform the difference image entropy computation between the input image and the average image. The average image here means the image which has average pixel values of a group of reference images corresponding to a certain gazing direction.

The method of computing difference image entropy between the input image and the reference image or between the input image and the average image is already described before so the detailed explanation regarding the difference image entropy computation will be omitted and it should be noted that the ordinary skilled in the art can implement the present invention with the current description about the difference image entropy computation without any difficulties.

The difference image entropy computations are performed for reference images or average images corresponding to all gazing directions in S204.

For example, let's assume that one object screen is divided into M×N. In this case, the number of the average images equals to M×N. S204 is to perform the difference image entropy computation between the input image and the average images or between the input image and the reference images. Accordingly, the number of values of the difference image entropy computation between the input image and the average images is also equal to M×N.

Then, among difference image entropy values, least difference image entropy value is searched and average image or reference image corresponding to the least difference image entropy value is selected (S205).

As a result of the selection in S205, a gazing direction corresponding to the selected average image or the selected reference image is regarded as gazing direction of user in the input image (S206). That is, the user's gazing direction in the input image is recognized by selecting average image or reference image with least difference image entropy value and regarding the gazing direction corresponding to the average image or reference image as the gazing direction of user in the input image. For example, if entropy value of difference image between the eye region image and average image representing (1, 1) region is the least value, then it is recognized that user is gazing the (1, 1) region.

The recognized gazing direction may be stored in any types of memory or supplementary storage device etc. and may be compared with the previously stored gazing directions, so that variation of the gazing directions can be tracked (S207).

Figure 3:
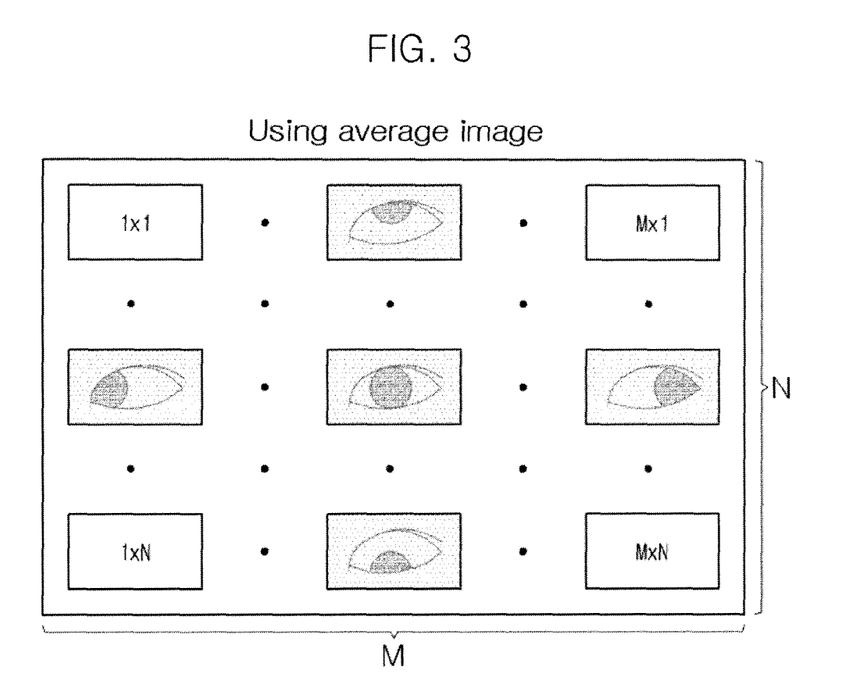
FIG. 3 illustrates average images representing M×N gazing directions in the object screen.

FIG. 3 illustrates average images representing M×N gazing directions in the object screen.

The object screen that users gaze may be divided into M×N regions and FIG. 3 illustrates average images corresponding to some regions, for the sake of convenience in explanation. The average image may be named as a×b image. In detail, 'a' means column and 'b' means row. For example, 1×1 image is average image representing reference images whose pupil looks a uppermost and leftmost region. Also, M×1 image is average image representing reference image whose pupil looks rightmost region in the first row.

The gaze tracking apparatus 100 according to the present invention stores average images representing each gazing direction to be matched with the inputted eye region image.

As illustrated in FIG. 3, five (5) average images that user gazes the uppermost, lowermost, leftmost, rightmost and center of the object screen can be stored in the gaze tracking apparatus 100 according to the present invention. Alternatively, the gaze tracking apparatus 100 according to the present invention may store all the average images respectively representing M×N gazing directions and thus may achieve better performance. In connection with this, it is preferable to consider deterioration of processing speed depending on increase of the stored average images when deciding appropriate number of average images to be stored therein.

Figure 4:
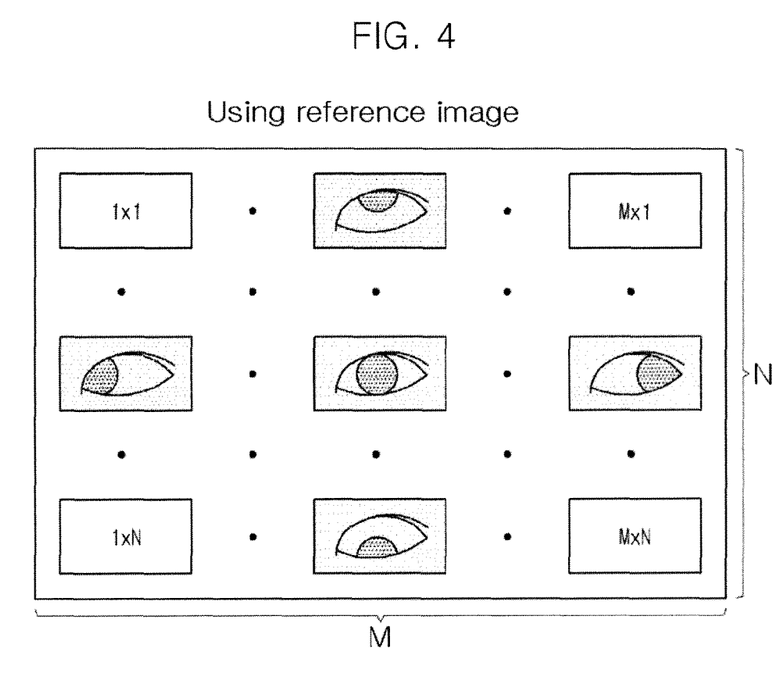
FIG. 4 illustrates reference images indicating M×N gazing directions in the object screen.

FIG. 4 illustrates reference images indicating M×N gazing directions in the object screen.

As with FIG. 3, the object screen that users gaze may be divided into M×N regions and the reference images may be named as a×b image. There is a difference in that images to be used for difference image entropy computation in FIG. 3 are average images and images to be used for difference image entropy computation in FIG. 4 are reference images. The other things than the above-mentioned difference from FIG. 3 are similar to the things explained regarding FIG. 3 and thus the detailed explanation will be omitted. It should be noted that the ordinary skilled in the art can implement the present invention with the current description without any difficulties.

Figure 5:
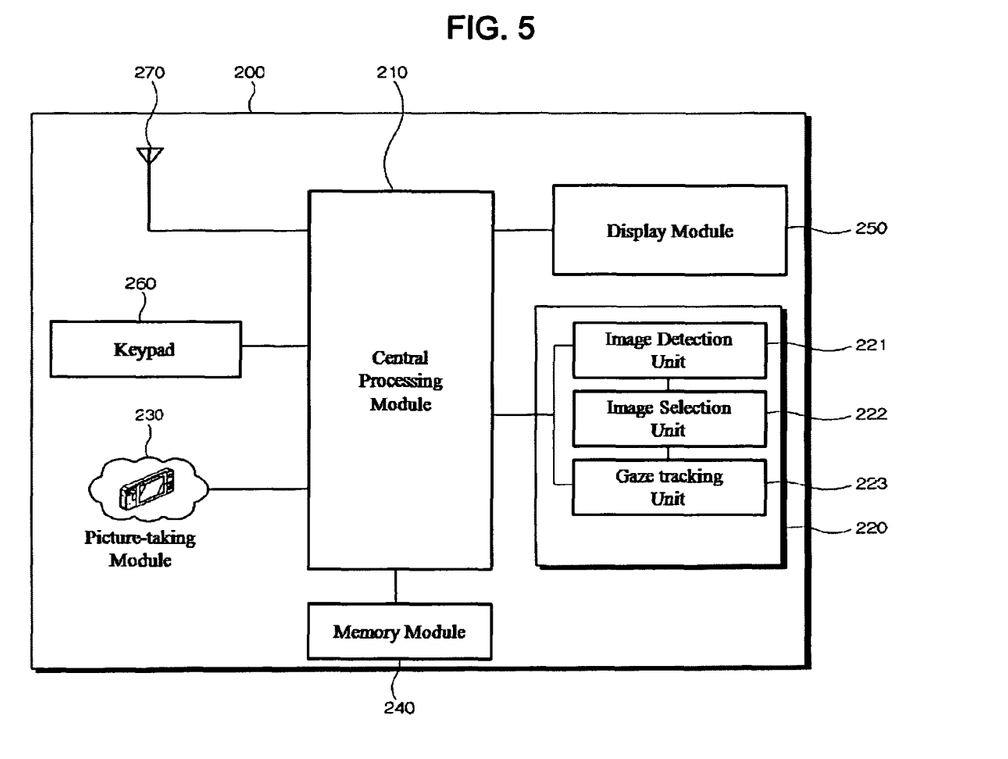
FIG. 5 illustrates configuration of an information processing apparatus according to another embodiment of the present invention.

FIG. 5 illustrates configuration of an information processing apparatus according to another embodiment of the present invention.

The information processing apparatus according to the embodiment of the present invention comprises: central processing module 210, gaze tracking module 220, picture-taking module 230, memory module 240, display module 250, keypad 260 and antenna 270.

The picture-taking module 230 is an apparatus such as camera and is configured to acquire images outside the information processing apparatus 200 and deliver the acquired images to the central processing module 210, etc.

The gaze tracking module 220 corresponds to the gaze tracking apparatus 100 in FIG. 1. The gaze tracking module 220 detects eye region image from the image taken by and delivered from the picture-taking module 230 and computes difference image entropy with average image or reference image. Based on such difference image entropy computation, the gaze tracking module 220 recognizes gazing direction of user and delivers the recognition result to the central processing module 210.

The central processing module 210 is configured to handle general control of the information processing apparatus 200 according to the embodiment of the present invention. The central processing module 210 performs various control depending on usages of the information processing apparatus 200. For example, when the information processing apparatus 200 is mobile terminal, the central processing module 210 may control activities of video communication or voice communication through antenna 270, etc. Alternatively, if the information processing apparatus 200 is a multimedia display apparatus such as portable multimedia player, the central processing module 210 may control to decode multimedia files stored in the memory module 240 and to output the decoded multimedia files to the display module 250 etc.

However, the central processing module 210 may perform control of selecting menu based on the gazing direction recognized by the gaze tracking module 220. For this, the central processing module 210 controls the display module 250 to display a number of selection buttons or menu in order for users to select.

When user gazes any of the selection buttons, the central processing module 210 controls the picture-taking module 230 to take a picture of the user. The central processing module 210 delivers the taken image of the user to the gaze tracking module 220 and requests the gaze tracking module 220 to analyze the gazing direction or region in the object screen that user is gazing. The central processing module 210 receives the result of the analysis from the gaze tracking module 220 and controls to perform activities corresponding to the selected selection button based on the result of the analysis.

It is possible for the information processing apparatus 200 in accordance with the present invention to provide an interface to be able to select menu by recognizing gazing direction of user through such activities of the central processing module 210.

It is also possible for the information processing apparatus 200 in accordance with the present invention to perform key input control using such methods. The central processing module 210 may perform key input control by controlling the display module 250 to display keyboard or similar shape of means, by recognizing gazing directions through the above-described methods and by regarding the recognized gazing directions as key inputs.

Furthermore, it is possible for the information processing apparatus 200 in accordance with the present invention to control a method of writing letters and a method of selecting slide type menu through the above-described methods. The central processing module 210 tracks gazing directions by controlling the memory module 240 to store gazing directions history therein. Through the method of tracking gazing directions, it is possible for the information processing apparatus 200 according to the present invention to perform selection of slide menu and to input hand writings or drawings.

The hardware devices described above can be configured as one or more software module to execute the operation of the present invention, and vice versa.

While the invention has been shown and described with respect to the preferred embodiments, it will be understood by those skilled in the art that various changes and modification may be made without departing from the spirit and scope of the invention as defined in the following claims.

What is claimed is:

1. A gaze tracking method using difference image entropy, comprising:
    detecting user's eye region image from inputted user's image;
    computing entropy value of difference image between the eye region image and a plurality of reference images respectively indicating each gazing direction and selecting reference image with least difference image entropy value among the plurality of reference images; and
    recognizing user's gazing direction by regarding gazing direction that the selected reference image indicates as user's gazing direction,
    wherein the difference image between the eye region image and the plurality of reference images is computed using Equation below:

$D(x,y) = I\text{input}(x,y) - I(x,y)$ where D (x, y) denotes pixel value of difference image between the eye region image and the reference images, Iinput (x, y) denotes pixel value of the eye region image and I (x, y) denotes pixel value of the reference image, and
    wherein entropy value of difference image between the eye region image and the reference images is computed by Equation below:

$$E = \sum_{k=-m}^{+m} P_k \log_2 \frac{1}{P_k} = -\sum_{k=-m}^{+m} P_k \log_2 P_k$$

Where E denotes difference image entropy value, 'm' denotes boundary value of ranges of difference image's pixel value, and Pk denotes probabilities of the frequency of histogram having pixel value of 'k' in difference images.

* * * * *